July 24, 1923.  1,462,847
H. BEHRENS
DEVICE FOR DISTRIBUTING PULVERULENT OR GRANULAR MATERIAL CONTINUOUSLY
SUPPLIED IN A CONTROLLED STREAM
Filed March 14, 1923
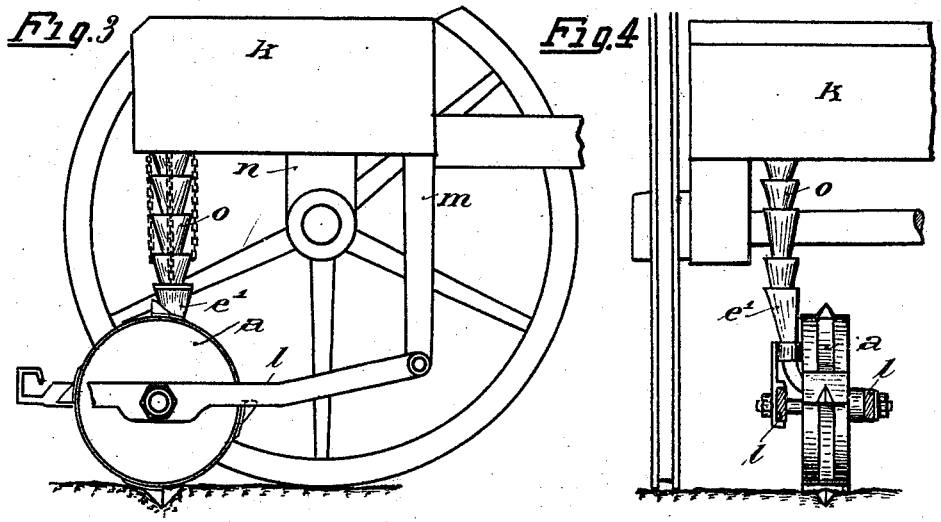
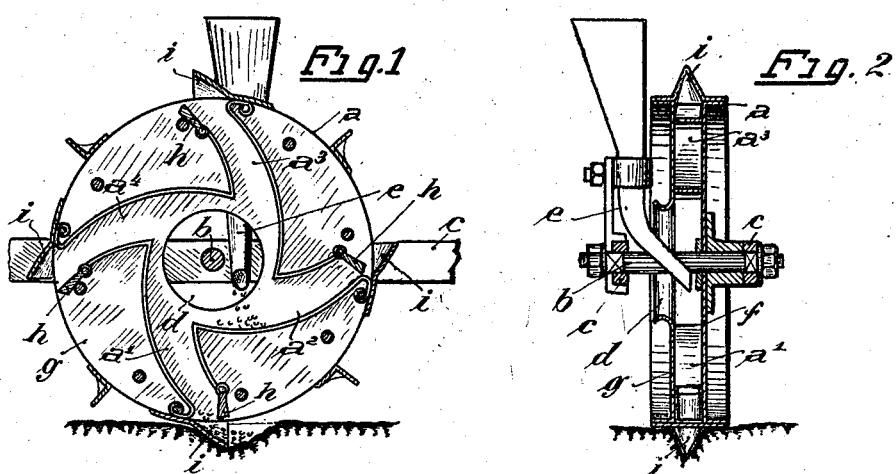
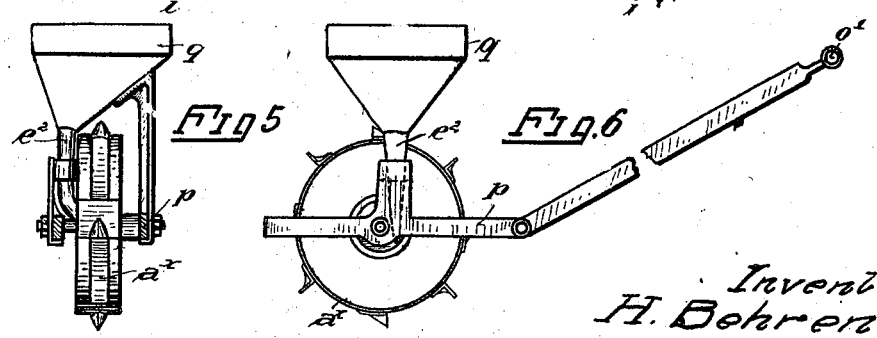
Inventor:
H. Behrens Patented July 24, 1923.

1,462,847

UNITED STATES PATENT OFFICE.

HEINRICH BEHRENS, OF BRUNSWICK, GERMANY.

DEVICE FOR DISTRIBUTING PULVERULENT OR GRANULAR MATERIAL CONTINUOUSLY SUPPLIED IN A CONTROLLED STREAM.

Application filed March 14, 1923. Serial No. 625,094.

To all whom it may concern:

Be it known that I, HEINRICH BEHRENS, citizen of the Free State of Brunswick, residing at Brunswick, have invented certain new and useful improvements in devices for distributing pulverulent or granular material continuously supplied in a controlled stream, of which the following is a specification.

The present invention relates to arrangements by means of which in a controlled stream continuously supplied pulverized or granular material may be carried on or deposited intermittently in equally proportioned quantities. In particular, the present invention relates to a distributing drum which is chiefly intended for depositing in tufts or bushes seed (such as beet-root seed), but which may also, with the same advantages, be employed for many other purposes. A special advantage of the subject of the present invention consists therein that, contary to other heretofore known depositing or sowing devices, it works without any complicated springs, bucket wheels or the like, and guarantees, by the special form of its drum alone an even distribution of the material supplied in a most simple and reliable manner.

In the accompanying drawing the invention is exemplified in a constructional form and in two practical modes of application. Fig. 1 is a vertical longitudinal section through the novel distributing drum, Fig. 2 is a cross section therethrough. Fig. 3 is a somewhat reduced vertical longitudinal section through part of a sowing machine, to which the new distributing drum has been fitted. Fig. 4 is a rear view of the arrangement according to Fig. 3. Fig. 5 is an elevation corresponding to Fig. 2 and shows a distributing drum made in form of a hand implement. Fig. 6 is a side elevation of Fig. 5.

According to the constructional form shown in Figs. 1 and 2 the distributing drum consists of a plurality, say four, short tubular sections $a^1$–$a^4$. According to the present invention these tubular sections are so arranged that they form tangents, or almost form tangents to a circle. The drum which thereby has the form of a ratchet wheel is fitted to a shaft $b$ journalled in the frame $c$ of the machine body. On the one side the drum has a circular opening $d$ (Figs. 1 and 2) the center of which coincides with the axis of the drum. Through this opening the known seed spout $e$ used in drilling machines projects into the interior of the drum. The discharge end of the spout $e$ which may be secured to the frame $c$ is eccentrically disposed to the axis of the drum in such a manner that the section, at the moment discharging the seed (in the drawing section $a^1$) will have passed the range (zone) of the seed distributing cone while the following section, $a^2$, will be receiving the desired quantity of seed which, obviously, depends on the size of the seed supply stream and the velocity of the drum. For each of the sections $a^1$ $a^4$ the seed supply is closed by the edge formed by the front wall of the respective section and the rear wall of the following section. Therefore it is necessary to arrange this edge in such a manner that it terminates the distributing cone of the supply spout before the section reaches a position, at which the seed may fall downwards out of it.

In the constructional form shown in the drawing the distributing drum is disposed between two discs $f$ and $g$ so as to form a kind of road wheel which, on the machine being drawn along, will roll over the ground. It has been found advisable to provide clapets $h$ acting by gravity, which will prevent any possibly occurring springing out of granular material, and also pressure shares which are so positioned that the seed bed made by them will close by itself. These shares will press the recesses into the soil which are necessary for receiving the seed to be deposited in tufts or bushes. It is obvious that with the aid of a drum according to the present invention as described it will be possible to deposit seed in a well gauged even number of quantities, contrary to the known devices, which briefly discontinue the stream flowing from the spout, but do not deposit a gauged quantity of seed at a given spot but merely produce streaks of deposited seed, as the machine advances while the passage of the stream of seed is released. The new distributing device, which is both simple and cheap in manufacture, will mean a great saving in seed as well as, above all, in labor, as it will no more be necessary to huddle the beet-root together to bushes as when they have been sown by other devices. A further advantage is that the little plants will develop better when growing in bushes or clusters as they then form a kind of germinating nest which will have a greater warmth than the surrounding soil. The new drum may, of course, be employed wherever there is the question of conveying or depositing in gauged quantities pulverulent or granular material supplied continuously in a controlled stream.

Figs. 3 and 4 show the new distributing drum in combination with a sowing machine of known kind. Beneath the box $k$ containing the seed a plurality of distributing drums $a$ are suspended, for example by means of links $l$, which are hinged to arms $m$ of the machine $n$. The seed is conducted by means of the known telescope tubes $e$ from the seed box $k$ to the feed spout $e^1$ of the distributing drums $a$. For reason of greater simplicity only one of these, namely the one furthest to the left, has been shown.

For smaller purposes, such as planting in a garden, the distributing drum shown in Figs. 5 and 6 will be sufficient, which may, for instance, be used in gardens for laying beans, beet seed and the like. Here the drum $a$ is journalled in a frame $p$, which is provided with a handle $e^1$ by means of which it can be pulled or pushed forward. The material to be sown or deposited is filled into a hopper $q$ from which it passes to the spout $e^2$ projecting into the drum.

I claim:

1. Device for distributing pulverulent or granular material continuously supplied in a controlled stream, consisting of a plurality of tubular sections disposed substantially tangentially around a circle and forming a drum, said drum being rotatable and having an inlet through which a stationary supply spout projects, each of said tubular sections constructed to intercept the supply of material into the preceding tubular section shortly before said preceding tubular section is in discharging position.

2. Device for distributing pulverulent or granular material continuously supplied in a controlled stream, consisting of a plurality of tubular sections disposed substantially tangentially around a circle and forming a drum, said drum being rotatable and having an inlet through which a stationary supply spout projects, each section having a curved front wall forming with the rear wall of the adjoining tubular section an edge, said edge being adapted to pass before and intercept the discharge from the said spout, shortly before said adjoining tubular section is in discharging position.

3. A device for distributing pulverulent or granular material including a spout adapted to continuously feed the material to be distributed, a shaft, a drum rotatable about the axis of said shaft and adapted to receive the material fed by said spout, said drum being provided with a plurality of substantially tangentially arranged discharge chutes, each having its outlet arranged adjacent to the periphery of the drum, the inlet of each discharge chute being arranged adjacent to the axis of said drum, the front wall of each chute merging into the rear wall of the chute forward of the same, and the merging point of said walls being so located that the rear wall of the one chute will intercept the flow of material from the spout into a preceding chute shortly before said preceding chute is in a position to permit its outlet to discharge material on the ground.

4. A device as claimed in claim 3 in which a gravity operated valve is provided at the outlet end of each chute.

In testimony whereof I have affixed my signature in presence of two witnesses.

HEINRICH BEHRENS.

Witnesses:
H. HENDERF,
FRANCIS J. DUGAN.